(12) United States Patent
Kashyap et al.

(10) Patent No.: US 8,767,549 B2
(45) Date of Patent: Jul. 1, 2014

(54) INTEGRATED METHODS OF PERFORMING NETWORK SWITCH FUNCTIONS

(75) Inventors: Prakash M. Kashyap, Cupertino, CA (US); Thanh Nguyen, San Jose, CA (US); Boon Ling Chew, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 496 days.

(21) Appl. No.: 12/975,039

(22) Filed: Dec. 21, 2010

(65) Prior Publication Data

US 2011/0149736 A1 Jun. 23, 2011

Related U.S. Application Data

(62) Division of application No. 11/116,949, filed on Apr. 27, 2005, now Pat. No. 7,860,006.

(51) Int. Cl.
| | |
|---|---|
| H04J 1/16 | (2006.01) |
| H04J 3/14 | (2006.01) |
| G06F 15/16 | (2006.01) |
| G06F 12/14 | (2006.01) |
| G06F 12/16 | (2006.01) |
| G06F 11/00 | (2006.01) |
| G08B 23/00 | (2006.01) |
| G06F 7/04 | (2006.01) |
| H04L 1/00 | (2006.01) |
| H04L 12/26 | (2006.01) |

(52) U.S. Cl.
USPC ........... 370/235; 370/229; 370/232; 370/252; 370/401; 709/229; 726/23; 726/26

(58) Field of Classification Search
USPC .......................................................... 370/235
See application file for complete search history.

(56) References Cited

U.S. PATENT DOCUMENTS

| | | | |
|---|---|---|---|
| 5,450,483 | A | 9/1995 | Williams |
| 6,003,084 | A | 12/1999 | Green et al. |
| 6,089,456 | A | 7/2000 | Walsh et al. |
| 6,321,264 | B1 | 11/2001 | Fletcher et al. |
| 6,356,629 | B1 | 3/2002 | Fourie et al. |
| 6,363,489 | B1 | 3/2002 | Comay et al. |

(Continued)

FOREIGN PATENT DOCUMENTS

WO    WO-2005112390    12/2004

OTHER PUBLICATIONS

Non-Final Office Action for U.S. Appl. No. 11/322,942, Mailed May 13, 2009, 21 Pages.

(Continued)

*Primary Examiner* — Ian Moore
*Assistant Examiner* — Jenee Williams
(74) *Attorney, Agent, or Firm* — Blakely, Sokoloff, Taylor & Zafman

(57) ABSTRACT

On-switch methods for enforcing a policy relating to one or more network switch resources, for detecting and mitigating a network anomaly, and for selectively filtering packets to an externally-accessible port, are provided. The methods may each be embodied as one or more rules held by one or more processor readable media, with one or more of the rules defining one or more conditions to be met by one or more usage-derived packet statistics, and one or more actions to be performed if the one or more conditions are met.

20 Claims, 6 Drawing Sheets

(56) References Cited

U.S. PATENT DOCUMENTS

| | | | |
|---|---|---|---|
| 6,651,101 B1 | 11/2003 | Gai et al. | |
| 6,678,835 B1 | 1/2004 | Shah et al. | |
| 6,721,424 B1 | 4/2004 | Radatti | |
| 6,771,649 B1 | 8/2004 | Tripunitara et al. | |
| 6,816,455 B2 | 11/2004 | Goldberg et al. | |
| 6,836,462 B1 | 12/2004 | Albert et al. | |
| 6,839,850 B1* | 1/2005 | Campbell et al. | 726/23 |
| 6,850,521 B1 | 2/2005 | Kadambi et al. | |
| 6,907,036 B1 | 6/2005 | Malalur | |
| 6,957,258 B2 | 10/2005 | Maher, III et al. | |
| 7,027,398 B2 | 4/2006 | Fang | |
| 7,072,332 B2 | 7/2006 | D'Souza | |
| 7,076,650 B1 | 7/2006 | Sonnenberg | |
| 7,082,102 B1 | 7/2006 | Wright | |
| 7,095,716 B1 | 8/2006 | Ke et al. | |
| 7,143,006 B2 | 11/2006 | Ma et al. | |
| 7,143,153 B1 | 11/2006 | Black et al. | |
| 7,234,168 B2 | 6/2007 | Gupta et al. | |
| 7,257,515 B2 | 8/2007 | Hacuptle | |
| 7,266,088 B1* | 9/2007 | Virgin | 370/252 |
| 7,293,238 B1 | 11/2007 | Brook et al. | |
| 7,299,296 B1 | 11/2007 | Lo et al. | |
| 7,409,714 B2 | 8/2008 | Gupta et al. | |
| 7,412,722 B1 | 8/2008 | Norris et al. | |
| 7,424,024 B2 | 9/2008 | Chen et al. | |
| 7,444,422 B1 | 10/2008 | Li | |
| 7,451,212 B2 | 11/2008 | Friedman | |
| 7,492,713 B1* | 2/2009 | Turner et al. | 726/22 |
| 7,546,635 B1 | 6/2009 | Krohn et al. | |
| 7,561,515 B2* | 7/2009 | Ross | 370/232 |
| 7,593,343 B1 | 9/2009 | Croak et al. | |
| 7,594,259 B1 | 9/2009 | Audet et al. | |
| 7,610,624 B1* | 10/2009 | Brothers et al. | 726/24 |
| 7,690,040 B2 | 3/2010 | Frattura et al. | |
| 7,725,587 B1* | 5/2010 | Jacoby et al. | 709/229 |
| 7,729,271 B2* | 6/2010 | Tsuchiya et al. | 370/252 |
| 7,748,040 B2 | 6/2010 | Adelstein et al. | |
| 7,832,009 B2* | 11/2010 | Wang et al. | 726/22 |
| 8,020,207 B2* | 9/2011 | Chow et al. | 726/22 |
| 8,255,996 B2 | 8/2012 | Elrod et al. | |
| 8,295,188 B2* | 10/2012 | Elrod | 370/252 |
| 2001/0044893 A1 | 11/2001 | Skemer | |
| 2002/0015387 A1 | 2/2002 | Houh | |
| 2002/0085561 A1 | 7/2002 | Choi et al. | |
| 2002/0103916 A1* | 8/2002 | Chen et al. | 709/229 |
| 2002/0133717 A1 | 9/2002 | Ciongoli et al. | |
| 2003/0009699 A1* | 1/2003 | Gupta et al. | 713/201 |
| 2003/0037260 A1* | 2/2003 | Milo | 713/201 |
| 2003/0177187 A1* | 9/2003 | Levine et al. | 709/205 |
| 2004/0098618 A1 | 5/2004 | Kim et al. | |
| 2004/0170123 A1* | 9/2004 | Carpenter et al. | 370/229 |
| 2004/0172557 A1* | 9/2004 | Nakae et al. | 713/201 |
| 2004/0250158 A1 | 12/2004 | Le Pennec et al. | |
| 2004/0255167 A1 | 12/2004 | Knight | |
| 2005/0018618 A1* | 1/2005 | Mualem et al. | 370/252 |
| 2005/0021740 A1 | 1/2005 | Bar et al. | |
| 2005/0025064 A1 | 2/2005 | Chang et al. | |
| 2005/0030952 A1 | 2/2005 | Elmasry et al. | |
| 2005/0050359 A1* | 3/2005 | Liang | 713/201 |
| 2005/0050365 A1 | 3/2005 | Seki et al. | |
| 2005/0091533 A1* | 4/2005 | Omote et al. | 713/201 |
| 2005/0136891 A1 | 6/2005 | Wang et al. | |
| 2005/0182950 A1* | 8/2005 | Son et al. | 713/189 |
| 2005/0213504 A1 | 9/2005 | Enomoto et al. | |
| 2005/0216770 A1 | 9/2005 | Rowett et al. | |
| 2005/0229244 A1* | 10/2005 | Khare et al. | 726/22 |
| 2005/0283837 A1* | 12/2005 | Olivier et al. | 726/24 |
| 2006/0018466 A1 | 1/2006 | Adelstein et al. | |
| 2006/0029104 A1 | 2/2006 | Jungck | |
| 2006/0048218 A1 | 3/2006 | Lingafelt et al. | |
| 2006/0072451 A1* | 4/2006 | Ross | 370/229 |
| 2006/0072456 A1 | 4/2006 | Chari et al. | |
| 2006/0095968 A1 | 5/2006 | Portolani et al. | |
| 2006/0095969 A1 | 5/2006 | Portolani et al. | |
| 2006/0098585 A1* | 5/2006 | Singh et al. | 370/252 |
| 2006/0133377 A1 | 6/2006 | Jain | |
| 2006/0153153 A1 | 7/2006 | Bhagwat et al. | |
| 2006/0168149 A1* | 7/2006 | Dispensa | 709/219 |
| 2006/0288411 A1* | 12/2006 | Garg et al. | 726/22 |
| 2007/0022479 A1* | 1/2007 | Sikdar et al. | 726/22 |
| 2007/0079379 A1* | 4/2007 | Sprosts et al. | 726/24 |
| 2007/0083929 A1* | 4/2007 | Sprosts et al. | 726/22 |
| 2007/0121596 A1* | 5/2007 | Kurapati et al. | 370/356 |
| 2007/0157306 A1* | 7/2007 | Elrod et al. | 726/22 |
| 2007/0192862 A1 | 8/2007 | Vermeulen et al. | |
| 2007/0192863 A1* | 8/2007 | Kapoor et al. | 726/23 |
| 2007/0220607 A1* | 9/2007 | Sprosts et al. | 726/24 |
| 2008/0086772 A1* | 4/2008 | Chesla | 726/23 |
| 2008/0127349 A1 | 5/2008 | Ormazabal et al. | |
| 2008/0240128 A1* | 10/2008 | Elrod | 370/401 |
| 2008/0291915 A1* | 11/2008 | Foschiano | 370/392 |
| 2009/0300759 A1* | 12/2009 | Wang et al. | 726/22 |
| 2009/0328219 A1* | 12/2009 | Narayanaswamy | 726/23 |

OTHER PUBLICATIONS

Non-Final Office Action for U.S. Appl. No. 11/694,767, Mailed Oct. 5, 2009, 12 Pages.

Final Office Action for U.S. Appl. No. 11/322,942, Mailed Nov. 4, 2009, 22 Pages.

Final Office Action for U.S. Appl. No. 11/694,767, Mailed Jun. 22, 2010, 19 Pages.

Non-Final Office Action for U.S. Appl. No. 11/116,949 Mailed Jul. 23, 2008, 12 Pages.

Final Office Action for U.S. Appl. No. 11/116,949 Mailed Dec. 30, 2008, 15 Pages.

Non-Final Office Action for U.S. Appl. No. 11/116,949 Mailed Aug. 18, 2009, 20 Pages.

Non-Final Office Action for U.S. Appl. No. 11/116,950 Mailed Mar. 31, 2009, 15 Pages.

Bruschi, et al., "S-ARP: A Secure Address Resolution Protocol", Proceedings of the 19th Annual Computer Security Applications Conference (ACSAC 2003), (Dec. 2003), 66-74, 9 pages.

Gubbins, Ed, "Extreme Unveils New 10-Gb/s Switch", Telephone Onlin, Dec. 8, 2003, available at: http://telephonyonline.com/broadband/web/telecom_extreme_unveils_new/index.html#top, 1 Page.

Hochmuth, Phil, "Extreme Switch Hits 10G, Adds Mgmt.", Network World fusion, Dec. 8, 2003, available at: http://www.nwfusion.com/news/2003/120810g.html, 3 Pages.

Kim, et al., "A Flow-based Method for Abnormal Network Traffic Detection", http://dpnm.postech.ac.kr/papers/NOMS/04/security-analysis/camera-ready/attack-analysis-v5-revision.pdf, (Apr. 2004), 14 pages.

Luca, Deri, "Passively Monitoring Networks at Gigabit Speeds Using Commodity Hardware and Open Source Software", http://www.nlanr.net/PAM2003/PAM2003papers/3775.pdf, (2003), 7 pages.

Musich, Paula, "Extreme Networks Releases Black Diamond 10 Gigabit Ethernet Switch", eWeek Enterprise News & Reviews, Dec. 8, 2003. available at: http://www.eweek.com/article2/0,1759,1517396,00.asp, 2 Pages.

Potter, Duncan et al., "New Product: BlackDiamond 10K—Industry's First Extensible Switching Platform", Extreme Networks Power Point Slides, Dec. 8, 2003, 16 Pages.

Sweeney, Terry, "Protected by the Network Gear", Network World Fusion, Mar. 22, 2004, available at: http://www.nwfusion.com/supp/2004/ndc2/0322netinfra.html, 6 Pages.

Telecommunications Online, "Product of the Month—Extreme Networks Launches Extensible Ethernet Switching Platform", Feb. 2004, available at: http://www.telecommagazine.com/default.asp?journalid=3&func=departments&page=0401t07&year=2004month=2, 2 Pages.

Wirbel, Loring "Extreme Enters 10-Gbit Switch Arena", EE Times Online, Dec. 15, 2003, available at: http://www.eetimes.com/story.OEG20031215S0053, 3 Pages.

Non-Final Office Action for U.S. Appl. No. 11/322,942, Mailed Jan. 20, 2011, 25 pages.

(56) References Cited

OTHER PUBLICATIONS

Non-Final Office Action for U.S. Appl. No. 11/322,942, dated Jul. 7, 2011, 23 pages.

Office Action for U.S. Appl. No. 11/322,942 dated Feb. 13, 2012, 23 pages.

Notice of Allowance for U.S. Appl. No. 11/322,942, dated Jun. 12, 2012, 17 pages.

Portokalids "Zero Hour Worm Detection and Containment Using Honeypots", http://www.cs.columbia.edu/~porto/Home_files/thes-full-2side.pdf. 2004, pp. 1-73.

Non-Final Office Action for U.S. Appl. No. 13/585,512, Mailed Jun. 5, 2013, 24 pages.

Notice of Allowance for U.S. Appl. No. 13/585,512 dated Sep. 16, 2013, 9 pages.

\* cited by examiner

INTEGRATED METHODS OF PERFORMING NETWORK SWITCH FUNCTIONS

CLAIM OF PRIORITY

This application is related to the non-provisional utility application entitled "RULE STRUCTURE FOR PERFORMING NETWORK SWITCH FUNCTIONS," filed on Apr. 27, 2005, having an application Ser. No. 11/116,950, the entire contents of which are incorporated herein by reference; and this application is a divisional patent application of, and claims priority to, the non-provisional utility application entitled "INTEGRATED METHODS OF PERFORMING NETWORK SWITCH FUNCTIONS," filed on Apr. 27, 2005, having an application Ser. No. 11/116,949, the entire contents of which are incorporated herein by reference.

BACKGROUND

This invention relates generally to the fields of network switch policy management, network security, and network anomaly detection and mitigation, and, more specifically, to distributed, on-switch methods of enforcing network switch policies, promoting network security, or detecting and mitigating network anomalies, which methods may be embodied as one or more rules stored locally at the network switches.

RELATED ART

To handle network attacks, viruses or other network anomalies, current networks typically perform a filtering function, centralized at one or more gateway switches that function as gateways between various subnets of the network, whereby potentially problematic packets are identified and sent to a port accessible by a network administrator and/or external appliance. The network administrator/external appliance manually examines the packets, and then takes appropriate action. If the packets in fact represent a network attack, virus or other anomaly, the network administrator may respond by downloading suitable rules known as Access Control Lists (ACLs) to the gateway switches within the network, instructing them to ignore the potentially problematic packets on an ongoing basis.

As this approach is highly fragmented, involving as it does detection of a potentially problematic packet at the gateway switch, followed by inspection of the packet by a network administrator/external appliance, followed by downloading of suitable ACLs at these gateway switches denying access to these packets, there is often a long latency between the time the potentially problematic packets are identified at the gateway switches and the time an appropriate response is implemented. Because of this latency, even after being detected, a network attack may propagate itself throughout the entire network, disrupting or disabling significant portions, before a response can be implemented.

Moreover, as this approach is often centralized at one or more gateway switches, it is incapable of detecting or responding to internal attacks that originate within a particular subnet. And it cannot exploit useful information maintained at the edge, non-gateway switches of a subnet that could assist in detecting and responding to many forms of network attacks.

Nor is this approach easily scaleable with the number of network switches in the network or the amount of traffic handled. In fact, as this approach involves filtering all packets of a particular type or from a particular user to the network administrator or external appliance, even if the packets are valid and unassociated with a network anomaly, it frequently overloads the network administrator as the number of switches, nodes or traffic within a network increases.

Nor can current ACLs solve the problem as current ACLs are incapable of detecting and responding to network attacks with the necessary level of precision and dynamism. Consider, for example, the following ACL (named icmp) configured for the purpose of addressing the problem of network flooding of a certain type of packet (ICMP echo requests) originating from a particular subnet (10.203.134.0/24):

```
entry icmp {
    IF {
        source-address 10.203.134.0/24;
        protocol icmp;
        icmp-type echo-request;
    } THEN {
        mirror enable icmp;
    }
}
```

As this ACL always mirrors ICMP echo requests from the particular subnet, it is triggered even when an ICMP echo flooding condition is not present, resulting in many valid ICMP requests being mirrored. Also, because it requires the network administrator or network appliances to sort through many valid ICMP echo requests, it has the potential of overloading the network administrator or external appliance. Further, because it always mirrors the ICMP requests, it is incapable of dynamically responding, such as permitting access to ICMP echo requests when a once-present flooding condition has abated.

Therefore, there is a need for a more integrated, rapid, dynamic, scaleable and integrated approach for enforcing a policy relating to one or more network switch resources and/or detecting and responding to one or more network attacks, viruses and other anomalies, and/or selectively filtering packets to an externally-accessible port.

SUMMARY

The invention provides a method, performed at or within a network switch, of enforcing a policy relating to one or more network switch resources, such as switch access or bandwidth. This method has three or more steps.

In the first step, the method updates one or more usage-derived packet statistics, such as a cumulative count of packet bytes received at the network switch from a particular user or transmitted from the network switch by a particular user.

In the second step, the method determines if one or more conditions are met, the one or more conditions comprising or including one or more conditions based on the one or more usage-derived packet statistics, such as whether the cumulative count of packet bytes received at the switch from the particular user or transmitted from the switch by a particular user exceeds a specified threshold.

In the third step, the method enforces the policy by performing one or more specified actions if the one or more conditions are met. For example, in this step, the method may deny the user further access to the switch if the cumulative count of packet bytes received so far at the switch from that user or transmitted from the switch by that user exceeds the specified threshold.

The invention also provides a method, performed at or within a network switch, of detecting and mitigating a network anomaly such as a network attack, virus or worm. This method has three or more steps.

In the first step, the method updates one or more usage-derived packet statistics, such as the rate at which packets of a certain type are received at or transmitted from the switch.

In the second step, the method detects a network anomaly responsive to the updating of the one or more usage-derived packet statistics. For example, in this step, the method may detect an anomalous packet flooding condition if the rate at which packets of a certain type received at or transmitted from the switch exceeds a specified threshold.

In the third step, if a network anomaly is detected, the method mitigates the anomaly by performing one or more actions. For example, in response to the detection of the foregoing packet flooding condition, the method may deny further access to such packets, at least until the flooding condition abates.

The invention further provides a method, performed at or within a network switch, of selectively filtering packets to an externally-accessible port. This method has four or more steps.

In the first step, one or more packets are received at or transmitted from the network switch.

In the second step, the method updates one or more usage-derived packet statistics responsive to the receipt or transmitting of the one or more packets. For example, in this step, the method might update the average size of ping-type packets received at or transmitted from the switch.

In the third step, the method determines if one or more conditions are met, the one or more conditions comprising or including one or more conditions based on the one or more usage-derived packet statistics. For example, in this step, the method might determine if the foregoing average ping-type packet size exceeds a specified threshold.

In the fourth step, the method mirrors or redirects the one or more packets to the externally-accessible port if the one or more specified conditions are met. For example, in this step, if the average ping-type packet size exceeds the specified threshold, indicating abnormally large ping-type packets and a potential network anomaly, the method might mirror the ping-type packets to a port accessible by a network administrator or external appliance, allowing the network administrator or external appliance to examine the packets to determine if in fact a network anomaly is present.

The invention further provides a system having one or more non-gateway switches interconnected to form a first subnet that is coupled to a second subnet through one or more gateway switches or servers. In this system, each of the one or more non-gateway switches includes a means for performing one or more of the foregoing methods.

Other systems, media, products, devices, methods, features and advantages of the invention will be or will become apparent to one with skill in the art upon examination of the following figures and detailed description. It is intended that all such additional systems, media, products, devices, methods, features and advantages be included within this description, be within the scope of the invention, and be protected by the accompanying claims.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% should be considered to be explicitly within the scope of the stated value.

As used herein, the term "software" includes source code, assembly language code, binary code, firmware, macro-instructions, micro-instructions, rules such as ACLs for performing one or more network switch functions, or the like, or any combination of two or more of the foregoing.

The term "processor readable medium" refers to any medium capable of holding software accessible by a processor, including but not limited to RAM, ROM, EPROM, PROM, EEPROM, disk, floppy disk, hard disk, CD-ROM, DVD, or the like, or any combination of two or more of the foregoing.

The term "processor" refers to any device capable of executing one or more software instructions and includes, without limitation, a general- or special-purpose microprocessor, finite state machine, controller, computer, digital signal processor (DSP), or the like.

The term "logic" refers to implementations in hardware, software, or combinations of hardware and software.

The term "ASIC" refers to an application specific integrated circuit.

The term "usage-derived packet statistic" refers to any statistic derived from usage of a packet within a network. Examples include a cumulative count of the number of packets of a certain type or from a particular user that are received at or transmitted from a network switch, a cumulative count of the number of bytes of such packets received at or transmitted from a network switch, the rate at which such packets or packet bytes are received at or transmitted from a network switch, a ratio of such rates, and the like.

Figure 1:
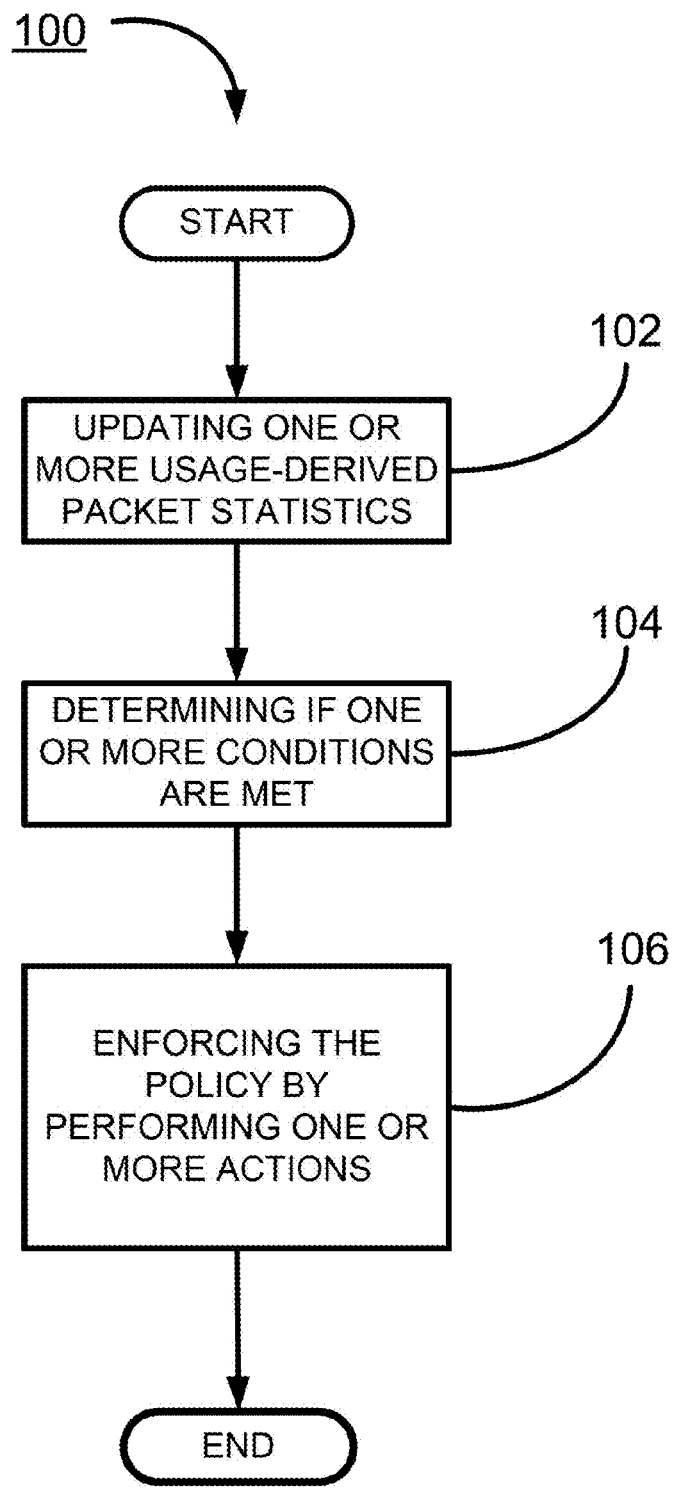
FIG. 1 is a flowchart of an embodiment of an on-switch method of enforcing a policy relating to one or more network switch resources.

1. Methods of Enforcing Policies Relating to One or More Network Switch Resources FIG. 1 illustrates an embodiment 100 of a method, performed at or within a network switch, of enforcing a policy relating to one or more network switch resources. In this embodiment, the method comprises three or more steps, identified respectively with numerals 102, 104 and 106.

Step 102 comprises updating one or more usage-derived packet statistics.

Step 104 comprises determining if one or more conditions are met, the one or more conditions comprising or including one or more conditions based on the one or more usage-derived packet statistics.

Step 106 comprises enforcing the policy by performing one or more predetermined actions if the one or more conditions are met.

In one implementation, the updating of the one or more usage-derived packet statistics occurs responsive to receipt of the one or more packets at the network switch or the transmission of the one or more packets from the network switch. Moreover, in this implementation, the method enforces the policy of denying further access to a user who has exhausted his quota of network switch resources (or permitting access but lowering the priority assigned to the user's packets) until the user renegotiates and pays or agrees to pay a higher price for additional access or restoring the original priority.

In one example of this implementation, as packets are received at the switch, the method maintains and updates a cumulative count of packets received from or transmitted by a particular user, a cumulative count of packet bytes received from or transmitted by a particular user, or the rate at which such packets or packet bytes are received at or transmitted from the switch. If the updated cumulative packet count, packet byte count, or rate exceeds a specified threshold, the method either denies the user further access, lowers the priority of packets from the user (such as by changing the QoS profile assigned to these packets), or sends a trap or logs a message to a server accessible by a network administrator alerting the network administrator to the situation. After the user agrees to pay a higher price for additional network access or to retain original priority, the method responds appropriately, such as by permitting the user further access, raising or restoring the priority assigned to the user's packets, or ceasing the sending of traps or logging of messages to the server accessible by the network administrator.

In a second implementation, the method enforces a user's quota only during business hours (9 AM-5 PM), denying a user exceeding his quota access during business hours, but allowing such a user access outside of business hours.

2. Methods of Detecting and Mitigating Network Anomalies

Figure 2:
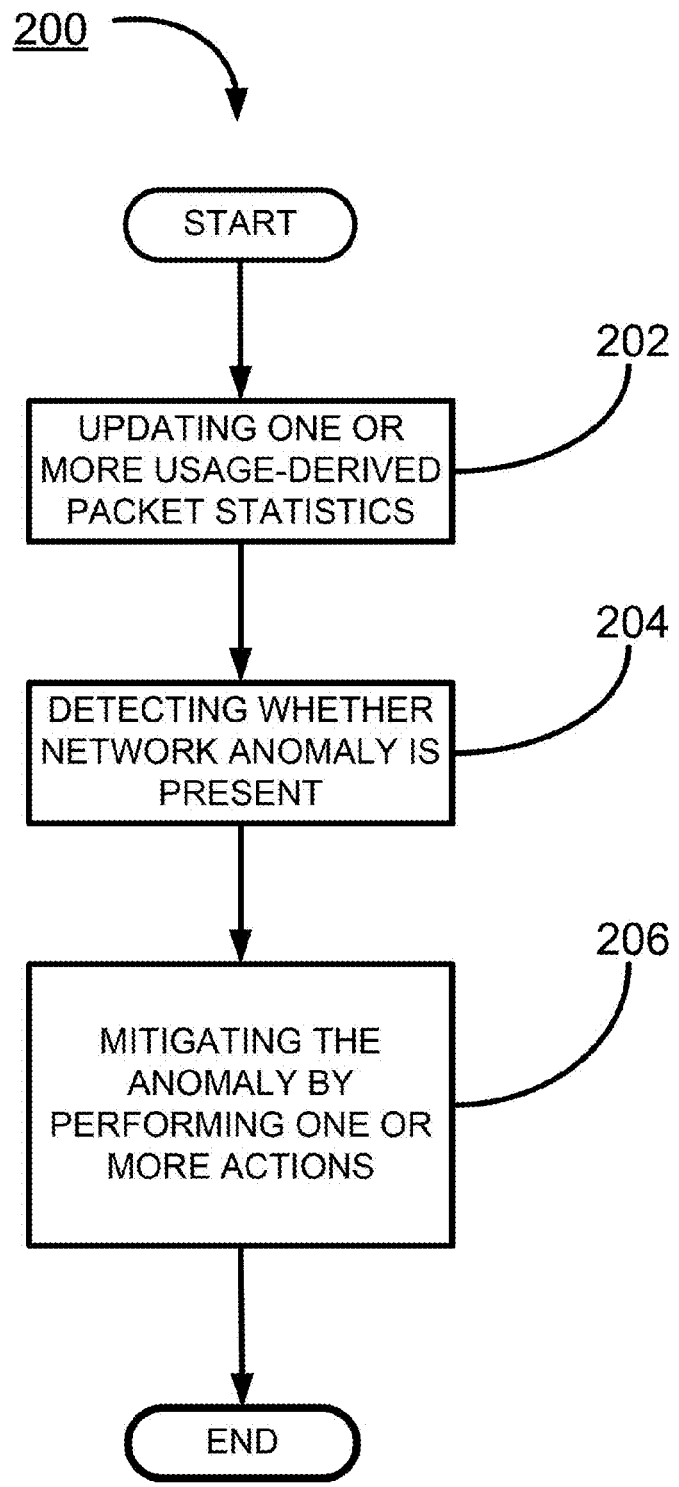
FIG. 2 is a flowchart of an embodiment of an on-switch method of detecting and mitigating a network anomaly.

FIG. 2 illustrates an embodiment 200 of a method, performed within or at a network switch, of detecting and mitigating a network anomaly. In this embodiment, the method comprises three or more steps, steps 202, 204 and 206.

Step 202 comprises updating one or more usage-derived packet statistics.

Step 204 comprises detecting a network anomaly responsive to the updating of the one or more usage-derived packet statistics.

Step 206 comprises mitigating the anomaly (if one is detected) by performing one or more actions.

In one implementation, the one or more usage-derived packet statistics are updated responsive to the receipt of one or more packets at the switch or transmission of one or more packets from the switch. Moreover, in this implementation, a network anomaly, in the form of a network attack, virus or worm, is detected from the updated one or more usage-derived packet statistics.

In one example, the network anomaly is characterized by packet flooding or excessive traffic of a particular kind of packet, and the method maintains and monitors one or more usage-derived packet statistics relating to this particular kind of packet, such as a cumulative count of the number of packets of this particular type that are received at or transmitted from the network switch, a cumulative count of the number of bytes of packets of this particular type that are received at or transmitted from the switch, the rate at which such packets or packets bytes are received at or transmitted from the switch, or a ratio of such rates. The method compares the statistic with a threshold to determine if a packet flooding or excessive traffic condition is present. If so, the method performed one or more actions to mitigate the anomaly, such as, for example, by blocking packets of the particular type or having a particular source address from the network switch, disabling the particular switch port at which such packets are received or from which they are transmitted, or logging a message to a server accessible by a network administrator to alert him of the situation.

In a second example, packets characteristic of a particular network anomaly have a signature, and the method detects whether packets having this particular signature are received at or transmitted from the network switch. If so, the method performs one or more actions to mitigate the anomaly, such as by blocking access to packets having the signature, sending a trap to a server accessible by a network administrator alerting him of the situation, or mirroring these packets to a port accessible by a network administrator so that the network administrator can examine the packets and take appropriate action.

In a third example, the network anomaly comprises excessive utilization of a particular switch port, and the method monitors the rate at which packets are received at or transmitted from this particular port. If the rate exceeds a threshold, the method takes appropriate action to mitigate the anomaly, such as by disabling the port.

In a fourth example, the network anomaly is excessive email traffic, and the method monitors the rate at which such traffic is received at or transmitted from the network switch. If the rate exceeds a threshold, the method performs one or more actions to mitigate the anomaly, such as blocking access to the switch by further email traffic.

3. Methods of Selectively Filtering Packets to an Externally-Accessible Port

Figure 3:
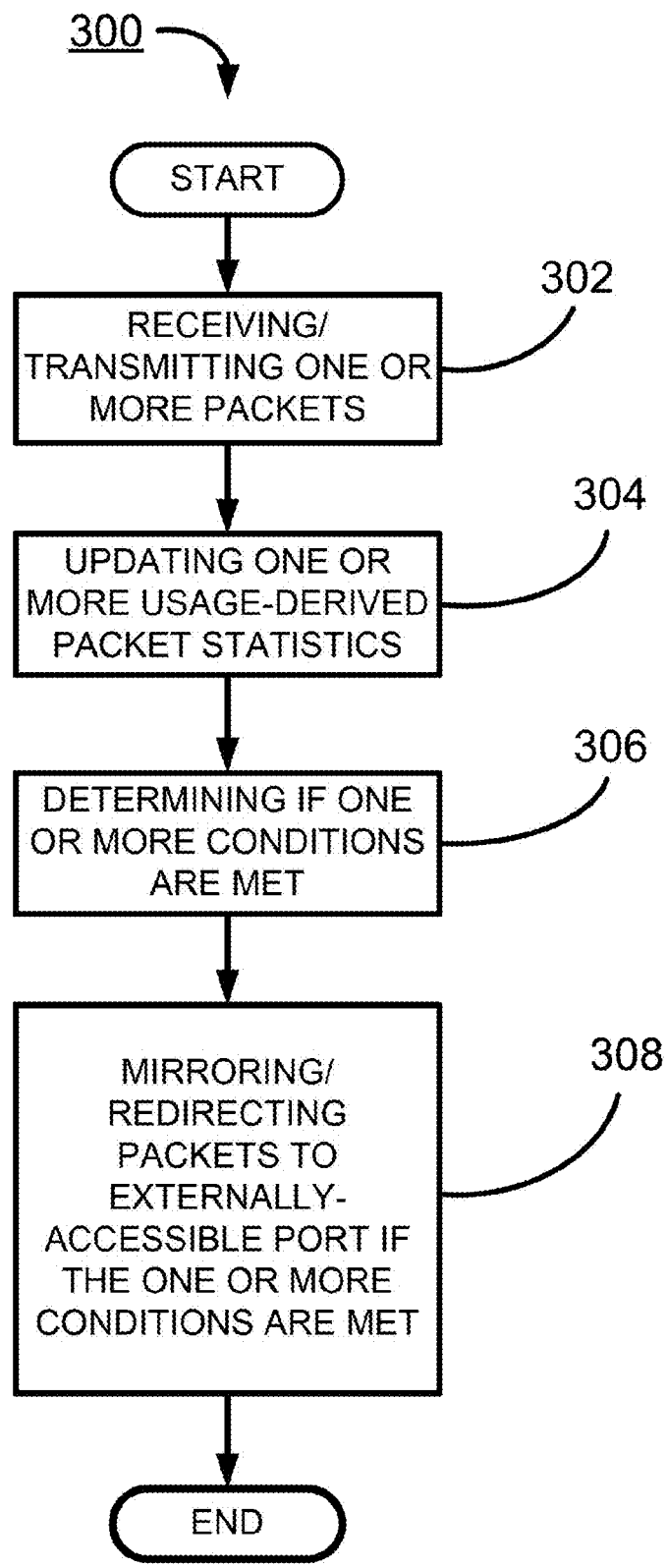
FIG. 3 is a flowchart of an embodiment of an on-switch method of selectively filtering packets to an externally-accessible switch port.

FIG. 3 illustrates an embodiment 300 of a method, performed at or within a network switch, of selectively filtering packets to an externally-accessible port. In this embodiment, the method comprises four or more steps, steps 302, 304, 306 and 308.

Step 302 comprises receiving one or more packets at the network switch or transmitting one or more packets from the network switch.

Step 304 comprises updating one or more usage-derived packet statistics responsive to the receipt or transmission of the one or more packets.

Step 306 comprises determining if one or more conditions are met, the one or more conditions comprising or including one or more conditions based on the one or more usage-derived packet statistics.

Step 308 comprises mirroring or redirecting the one or more packets to the port if the one or more conditions are met.

In one example of this method, responsive to the receipt of one or more packets at the network switch, or transmission of one or more packets from the network switch, the method updates a ratio of first and second rates, the first rate comprising a rate at which bytes of a certain type of packet are received at or transmitted from the switch, and the second rate is a rate of which the certain type of packets are received at or transmitted from the switch. The method then compares the updated ratio with a threshold. If the updated ratio exceeds the threshold condition, indicating a potential network anomaly, the method mirrors or redirects the one or more packets to an externally-accessible port, where they may be examined by a network administrator or external appliance.

In a second example, responsive to the receipt of one or more packets at a particular ingress port or VLAN of the network switch, or transmission of one or more packets from a particular egress port or VLAN of the network switch, the method updates a statistic comprising the rate at which such packets are received or transmitted. If the rate exceeds a threshold, indicating a potential network anomaly, the method mirrors or redirects the packets to an externally-accessible port.

In a third example, responsive to the receipt of one or more packets of a particular type at a network switch, the method updates a statistic comprising the rate at which such packets are received at or transmitted from the switch. If the rate exceeds a threshold, indicating a potential network anomaly, the method mirrors or redirects the one or more packets to the externally-accessible port.

4. Rules for Implementing the Foregoing Methods

Figure 4:
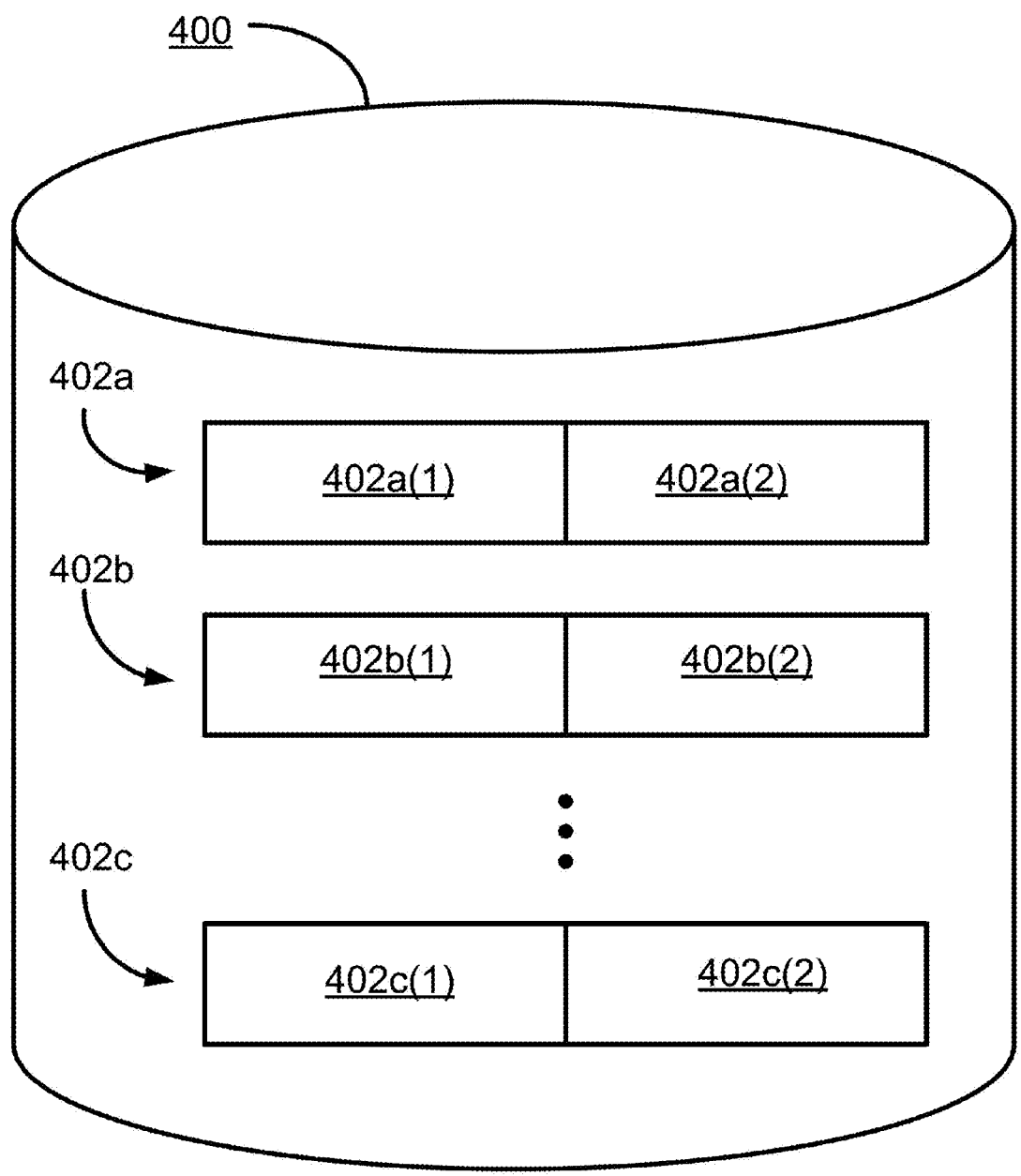
FIG. 4 illustrates an embodiment of one or more processor readable media holding one or more rules embodying any of the foregoing methods.

FIG. 4 illustrates an embodiment of one or more processor readable media 400 holding one or more rules 402a, 402b, 402c embodying any of the foregoing methods. One or more of the rules 402a, 402b, 402c in this embodiment conform to a rule structure comprising a first specification 402a(1), 402b(1), 402c(1) defining one or more conditions, the one or more conditions comprising or including one or more conditions to be met by one or more usage-derived packet statistics, and a second specification 402a(2), 402b(2), 402c(2) defining one or more actions to be taken by the network switch if the one or more conditions are met.

In one implementation, the one or more rules are software rules, each of which conforms to a rule structure that may be represented by one or more IF THEN ELSE statements, each having the form:

IF {one or more conditions are met};
THEN {one or more actions to be taken if one or more conditions are met);
ELSE {one or more actions to be taken if one or more conditions unmet}.

In this implementation, the first specification is within the IF clause and defines the one or more conditions that are to be met, and the second specification is within the THEN clause and defines the one or more actions to be taken if the one or more conditions defined by the first specification are met. In addition, a third specification within the ELSE clause defines the one or more actions to be taken if the one or more conditions defined by the first specification are unmet.

In a second implementation, the one or more rules 402a, 402b, and 402c build on and extend other rules based on matching conditions defined in terms of matching packet profiles, including matching data in the packet header. The following example illustrates such a rule, rule1, for incrementing a counter, counter1, when a packet destined for a particular subnet (having address 192.168.16.0/24 and port 2049) is encountered. This is followed by a second rule, rule2, that denies access by these packets to the network switch if the contents of counter1 exceed a threshold of 1,000,000:

```
entry rule1 {
    IF {
        destination-address 192.168.16.0/24;
        destination-port 2049;
    }
    THEN {count counter1}
entry rule2 {
    IF {count counter1 > 1000000 }
        THEN {deny rule1}
```

In one example of this second implementation, the rules based on matching packet profiles are software rules having the following format:

```
entry {<rule-name>} {
    IF    {
        <match conditions>
    }
    THEN {
        <action>;
        <action-modifers>;
    }
}
``` where <rule-name> is the name of the rule, and one or more of the specified <match conditions> involve data within the packet or packet header, such as but not limited to the following:

IP source address
IP destination address
IP protocol
IP TOS bits
a flag indicating whether the packet is fragmented
TCP or UDP source port
TCP or UDP destination port
TCP flags
IGMP message type
IGMP type
IGMP code
Ethernet packet type
Ethernet source MAC address
Ethernet destination MAC address In this particular example, a "prefix" operator can be used to specify a match condition based on a prefix of a specified packet field rather than the entirety of the field, e.g., a prefix of the IP source and destination addresses, rather than the entirety of these addresses; a "number" operator can be used to define a match condition based on a packet field being equal to a particular numerical value, e.g., TCP or UDP source or destination port numbers being equal to a specified value; a "range" operator can be used to specify a match condition based on a packet field being within a range of numerical values; a "bit-field" operator can be used to define a match condition based on specific packet bits being equal to a particular value, e.g., TCP flags being equal to a particular value; and a "MAC-address" operator can be used to define a match condition based on the Ethernet source or destination (MAC) address of the packet.

Also in this particular example, the match conditions may involve one or more logical conditions such as == (equal to), != (not equal to), > (greater than), >= (greater than or equal to), < (less than), and <= (less than or equal to).

The <action> that may be specified includes "permit," indicating that the packet is to be accepted and forwarded to its final destination, or "deny," indicating that the packet is to be dropped and not further processed The <action-modifiers> that may be specified include 1) count <countername>, which indicates that a packet count of packets meeting the specified profile is maintained in <countername>, and is to be incremented when a packet meeting the specified profile is received at the one or more ports or VLANs to which the rule is applicable or transmitted from one or more such ports or VLANs; 2) qosprofile <QosProfileName>, which indicates that packets meeting the specified profile are to be assigned the specified QoS profile; and 3) Sample <N>, which indicates that incoming packets are to be statistically sampled by sending every Nth packet to a CPU or other processor accessible by a network administrator.

In this second implementation, the rules based on satisfying one or more usage-derived packet statistics are diverse. An example of this latter type of rule is a rule that specifies one or more actions to be taken if a cumulative packet count, equal to the cumulative count of a particular type of packet received at one or more ingress ports or VLANs or transmitted from one or more egress ports or VLANs, equals, is not equal to, exceeds, equals or exceeds, is less than, or is less than or equal to, a certain threshold value. The following illustrates the format of such a rule:

```
entry <rulename> {
    IF { count <counterName> REL_OPER <countThreshold> ;
    period {interval};
    hysteresis {hysteresis};
    }
    THEN {
        <actionListIf>;
    } ELSE {
        {actionListElse};
    }
}
``` where

<ruleName> is the rule name;

<counterName> is the name of a counter from which the cumulative packet count is obtained;

<counterThreshold> is the threshold that is compared to the counter contents;

REL_OPER is a relational operator, i.e., ==, !=, >, >=, <, or <=;

{interval} is an optional evaluation interval in seconds defining the time period over which the execution of the rule is repeated. For example, a value of 10 specifies that, every 10 seconds, the cumulative packet count (represented by the contents of <counterName>) are compared with the indicated threshold. If not specified, either a default value may be used or the execution of the rule performed once;

{hysteresis} is an optional hysteresis value. Once the logical expression within the IF statement is true, the new threshold is adjusted with the hysteresis value. For > and >= expressions, the new threshold becomes (<countThreshold>−{hysteresis}). For < and <= expressions, the new threshold becomes (<countThreshold>+{hysteresis}). If {hysteresis} is greater than <countThreshold>, {hysteresis} is set to zero;

<actionListIf> is a list of one or more actions to be performed if the logical expression forming the subject of the IF statement is logically true; and <actionListElse> is an optional list of one or more actions to be performed if the logical expression forming the subject of the IF statement is logically false.

In the following example of this particular rule format, the counter counter1 is incremented whenever a packet destined for a particular subnet (destination address 192.168.16.0/24, port 2049) is received or transmitted. The contents of the counter are evaluated every 10 seconds. If the value of counter1 is greater than 1,000,000 packets, a trap message is sent to the snmp server to alert the network administrator, and the packets are denied access to the network switch.

```
entry rule1 {
    IF {
        destination-address 192.168.16.0/24;
        destination-port 2049;
        protocol tcp;
    } THEN {
        count counter1;
    }
}
entry count_rule_example {
    IF { count counter1 > 1000000 ;
        period 10 ;
    }
    THEN {
        snmptrap 123 "Traffic on rule1 exceeds threshold"; # Send a single
        trap deny rule1; # Action converts the rule rule1 to a
        "deny" rule.
    }
}
```

Another example is a rule that specifies one or more actions to be taken if a packet rate, equal to the rate at which a particular packet type is received at one or more ingress ports or VLANs, equals or transmitted from one or more egress ports or VLANs, is not equal to, exceeds, equals or exceeds, is less than, or is less than or equal to, a certain threshold value. The following illustrates the format of such a rule:

```
entry <rulename>    {
    IF { delta <counterName> REL_OPER <countThreshold> ;
    period {interval};
    hysteresis {hysteresis};
    }
    THEN {
        <actionListIf>;
    } ELSE {
        {actionListElse};
    }
}
``` where

<ruleName> is the rule name;

<counterName> is the name of a counter from which the change in cumulative packet count is derived since the last execution of the rule;

<counterThreshold> is the threshold that is compared to the change in counter contents;

REL_OPER is a relational operator, i.e., ==, !=, >, >=, <, or <=;

{interval} is an optional evaluation interval in seconds defining the time period over which the execution of the rule is repeated. For example, a value of 10 specifies that, every 10 seconds, the change in the cumulative packet count (represented by change in the contents of <counterName> since the last execution of the rule) are compared with the indicated threshold. If not specified, either a default value may be used or the execution of the rule performed once;

{hysteresis} is an optional hysteresis value. Once the logical expression within the IF statement is true, the new threshold is adjusted with the hysteresis value. For > and >= expressions, the new threshold becomes (<countThreshold>−{hysteresis}). For < and <= expressions, the new threshold becomes (<countThreshold>+{hysteresis}). If {hysteresis} is greater than <countThreshold>, {hysteresis} is set to zero;

<actionListIf> is a list of one or more actions to be performed if the logical expression forming the subject of the IF statement is logically true; and <actionListElse> is an optional list of one or more actions to be performed if the logical expression forming the subject of the IF statement is logically false.

In the following example of this particular rule format, the counter counter1 is incremented whenever a packet destined for a particular subnet (destination address 192.168.16.0/24, port 2049, protocol TCP) is encountered (received or transmitted). The contents are the counter are evaluated every 10 seconds. If the delta (change) of the counter1 value over the last 10 seconds is greater or equal than 1,000 packets, a trap message is sent to the snmp server to alert the network administrator, and the QoS profile assigned to the packets is changed to reflect a lower priority status. If the delta value continues to exceed 1,000 packets, a trap message is sent to the snmp server every 120 seconds. Once the delta value falls below 1,000 packets, another message is to the snmp server indicating this, and the QoS profile assigned to the packets is restored to reflect the original priority status.

```
entry rule1 {
  IF {
    destination-address 192.168.16.0/24;
    destination-port 2049;
    protocol tcp;
  } THEN {
    count counter1;
  }
}
entry delta_rule_example {
  IF { delta counter1 >= 1000 ; }
    THEN {
      snmptrap 123 "Traffic to 192.168.16.0/24 exceed rate limit" 120;
# One every 120 seconds
      qosprofile rule1 QP3; # Move traffic to QP3
    } ELSE {
      snmptrap 123 "Traffic to 192.168.16.0/24 falls below rate limit";
      qosprofile rule1 QP1; # restore traffic to default qos profile
    }
}
```

A third example is a rule that specifies one or more actions to be taken if a ratio of cumulative packet counts, each comprising a cumulative count at which a particular type of packet is received at one or more ingress ports or VLANs or transmitted from one or more egress ports or VLANs, equals, does not equal to, exceeds, equals or exceeds, is less than, or is less than or equal to, a certain threshold value. The following illustrates a possible format of such a rule:

```
entry <rulename> {
    IF { ratio <counterNameA> <counterNameB>
    REL_OPER .countThreshold> ;
    period {interval};
    min-value {min-value};
    hysteresis {hysteresis};
    }
    THEN {
        <actionListIf>;
    } ELSE {
        {actionListElse};
    }
}
``` where
<ruleName> is the rule name;
<counterNameA> is the name of a counter from which the cumulative count of packet type A is obtained since the last execution of the rule. The cumulative count of packet type A forms the dividend of the ratio;
<counterNameB> is the name of a counter from which the cumulative count of packet type B is obtained since the last execution of the rule. The cumulative count of packet type B forms the divisor of the ratio;

<counterThreshold> is the threshold that is compared to the ratio (contents of counter A divided by the contents of counter B);
REL_OPER is a relational operator, i.e., ==, !=, >, >=, <, or <=;
{interval} is an optional evaluation interval in seconds defining the time period over which the execution of the rule is repeated. For example, a value of 10 specifies that, every 10 seconds, the rule is executed by comparing the ratio of the contents of <counterNameA> and the contents of <counterNameB> with the indicated threshold;
{min-value} is an optional minimum value of both the counter A and B contents before these values are considered valid. If either the counter A or counter B values, forming the dividend and divisor, respectively, is below the specified minimum value, the logical expression forming the subject of the IF statement is declared logically false. If not specified, a default value may be used;
{hysteresis} is an optional hysteresis value. Once the logical expression within the IF statement is true, the new threshold is adjusted with the hysteresis value. For > and >= expressions, the new threshold becomes (<countThreshold>-{hysteresis}). For < and <= expressions, the new threshold becomes (<countThreshold>+{hysteresis}). If {hysteresis} is greater than <countThreshold>, {hysteresis} is set to zero;
<actionListIf> is a list of one or more actions to be performed if the logical expression forming the subject of the IF statement is logically true; and
<actionListElse> is an optional list of one or more actions to be performed if the logical expression forming the subject of the IF statement is logically false.

In the following example of this particular rule format, the counter counter1 is incremented whenever a UDP packet is encountered, and the counter counter2 is incremented whenever a TCP packet is encountered. The counter1 and counter2 values are evaluated every 2 seconds. If both counter values exceed the minimum valid threshold of 1,000, and the ratio of counter1 to counter2 exceeds 5, a message is logged to the message server alerting the network administrator to the situation. In the message string, the $ruleName, $ruleValue, and $ruleThreshold keywords are variables that are replaced with the actual values when the message is logged. Otherwise, no action is performed.

```
entry rule1 {
    IF {
        protocol udp;
    } THEN {
        count counter1;
    }
}
entry rule2 {
    IF {
        protocol tcp;
    } THEN {
        count counter2;
    }
}
entry ratio_rule_example {
    IF { ratio counter1 counter2 > 5 ;
        period 2;
        min-value 1000;
    }
    THEN {
        syslog "Rule $ruleName threshold ratio $ruleValue exceeds limit $ruleThreshold" INFO;
    }
}
```

A fourth example is a rule that specifies one or more actions to be taken if a ratio of packet rates, each comprising a rate at which a particular type of packet is received at one or more ingress ports or VLANs or transmitted from one or more egress ports or VLANs, exceeds, equals or exceeds, is equal to, not equal to, less than, or is less than or equal to, a certain threshold value. The following illustrates a possible format of such a rule:

```
entry <rulename> {
    IF { delta-ratio  <counterNameA>  <counterNameB>
REL_OPER.countThreshold> ;
        period {interval};
        min-value {min-value};
        hysteresis {hysteresis};
    }
    THEN {
        <actionListIf>;
    } ELSE {
        {actionListElse};
    }
}
``` where

<ruleName> is the rule name;

<counterNameA> is the name of a counter from which the change in packet count of packet type A is obtained since the last execution of the rule. The change in packet count of packet type A forms the dividend of the ratio;

<counterNameB> is the name of a counter from which the change in packet count of packet type B is obtained since the last execution of the rule. The change in packet count of packet type B forms the divisor of the ratio;

<counterThreshold> is the threshold that is compared to the ratio (change in contents of counter A divided by the change in contents of counter B);

REL_OPER is a relational operator, i.e., ==, !=, >, >=, <, or <=;

{interval} is an optional evaluation interval in seconds defining the time period over which the execution of the rule is repeated. For example, a value of 10 specifies that, every 10 seconds, the rule is executed by comparing the ratio of the change in contents of <counterNameA> and the change in contents of <counterNameB> with the indicated threshold;

{min-value} is an optional minimum value of both the change in counter A and B contents before these values are considered valid. If the change in the contents of either the counter A or counter B values, forming the dividend and divisor, respectively, is below the specified minimum value, the logical expression forming the subject of the IF statement is declared logically false. If not specified, a default value may be used;

{hysteresis} is an optional hysteresis value. Once the logical expression within the IF statement is true, the new threshold is adjusted with the hysteresis value. For > and >= expressions, the new threshold becomes (<countThreshold>−{hysteresis}). For < and <= expressions, the new threshold becomes (<countThreshold>+{hysteresis}). If {hysteresis} is greater than <countThreshold>, {hysteresis} is set to zero;

<actionListIf> is a list of one or more actions to be performed if the logical expression forming the subject of the IF statement is logically true; and <actionListElse> is an optional list of one or more actions to be performed if the logical expression forming the subject of the IF statement is logically false.

In the following example of this particular rule format, the tcpSynCounter is incremented whenever a TCP SYN packet is encountered, and tcpCounter values is incremented whenever a general TCP packet is encountered. Both counters are evaluated every 2 seconds. At that time, the change (delta) in each counter over the previous 2 seconds is computed. If both counter values exceed the minimum valid threshold of 100, and the ratio of the change in tcpSynCounter to that in tcpCounter exceeds 10, indicating the onset of a TCP SYN Flood, then a warning message is logged onto the message server (after the variable $port is replaced with its actual value), and all SYN traffic is denied access to the specified switch port. As no "period" value for the syslog message is specified, the message is only logged once. If the ratio of the change in the two counters subsequently falls below 10 (the ratio must fall below 8 because a hysteresis value of 2 is specified), another message is logged (again after making the variable substitution) indicating this, and access to the specified port by SYN traffic re-enabled.

```
entry syn {
    IF {
        tcp_flags SYN;
    } THEN {
        count tcpSynCounter;
    }
}
entry tcp {
    IF {
        protocol tcp;
    } THEN {
        count tcpCounter;
    }
}
entry delta_ratio_rule_example {
    IF { delta-ratio tcpSynCounter tcpCounter > 10 ;
        period 2;
        min-value 100;
        hysteresis 2;
    }
    THEN {
        syslog "Syn attack on port $port is detected" WARN;
        deny syn;
    } ELSE {
        syslog "Syn attack on port $port is no longer detected" WARN;
        permit syn;
    }
}
```

A fifth example is a rule that specifies one or more actions to be taken if a "true" count from another rule, i.e., a count of the number of logical condition(s) specified in the IF portion of the other rule that are satisfied, equals, is not equal to, exceeds, equals or exceeds, is less than, or is less than or equal to, a certain threshold value. The following illustrates a possible format of such a rule:

```
entry <rulename> {
    IF { rule-true-count <name> REL_OPER <countThreshold> ;
    }
    THEN {
        <actionListIf>;
    } ELSE {
        {actionListElse};
    }
}
``` where

<ruleName> is the rule name;

<name> is the name of a previous rule;

<counterThreshold> is the threshold that is compared to the true count from the previous rule;

REL_OPER is a relational operator, i.e., ==, !=, >, >=, <, or <=;

<actionListIf> is a list of one or more actions to be performed if the logical expression forming the subject of the IF statement is logically true; and <actionListElse> is an optional list of one or more actions to be performed if the logical expression forming the subject of the IF statement is logically false.

And example of this particular rule is as follows:

```
entry rule1 {
    IF { count counter1 > 10000 ;
        count counter2 > 10000 ;
        count counter3 > 10000 ;
        count counter4 > 10000 ;
    }
    THEN {
        ;
    }
}
entry rule2 {
    IF { count counter5 > 10000;
        count counter4 > 10000 ;
        rule-true-count rule1 >= 1;
    }
    THEN {
        ;
    }
}
```

Note that this rule, rule2, is equivalent to the following:

```
IF{
    counter1 > 10000;
    counter2 > 10000;
    counter3 > 10000;
    counter4 > 10000;
    counter5 > 10000;
    counter6 > 10000
}
    THEN {
        ;
    }
```

The one or more actions that may be taken within either the THEN or ELSE portions of the foregoing rules are diverse, and include either starting or stopping packet mirroring to a port accessible by a network administrator. In one implementation, such actions may be specified by the following syntax:

mirror [add/delete]<RuleName> where "add" specifies that mirroring is to be started while "delete" indicates it is to be stopped, and <RuleName> identifies the rule that defines the profile of the packets that are to be mirrored or not. For example, the command "mirror add rule1" mirrors packets having the packet profile defined by rule1, while the command "mirror delete rule2" turns off mirroring of packets having the packet profile defined by rule2.

The one or more actions may also include starting or stopping redirecting packets to a port accessible by a network administrator.

These actions may further include reconfiguring the switch, such as by disabling one or more ports or deleting one or more ports from a VLAN. In one implementation, such actions are specified using a command line interface (CLI) command having the following syntax:

cli <cliCommand> where <cliCommand> is a CLI command such as the following "configure" command:

configure access-list <ruleName>{ports <portlist>|vlan <vlanName>|any} {direction}

This command applies the identified rule <ruleName> to the ports of the switch identified in <portlist>, to the VLAN specified by <vlanName>, or all ports of the switch if the term "any" is present. The value <direction> indicates whether the rule is to be applied to ingress ports or VLANs, or egress ports or VLANs. If neither is specified, the default value {ingress} is assumed.

Another example is the following "unconfigure" command:

unconfigure access-list <ruleName>{ports <portlist>|vlan <vlanName>|any} {direction} which removes application of the rule <ruleName> from the ports identified in <portlist>, the VLAN identified by <vlanName>, or all ports if the term "any" is specified. The value <direction> specifies whether application of the rule is removed from ingress ports or VLANs, or egress ports or VLANs. If neither is specified, the default value {ingress} is assumed.

A third example is the following "refresh" command:

refresh policy <ruleName> which "refreshes" the indicated rule by resetting the contents of the counter specified by the rule to 0.

A fourth example is the following "configure mirroring add" command:

configure mirroring add [port <port>|vlan <vlanName>]

which mirrors packets received at the identified ingress port(s) or VLAN.

A fifth example is the following global "add/delete mirroring" command:

[disable|enable] mirror where "disable mirror" disables mirroring on a global basis, and "enable mirror" enables mirroring on a global basis.

A sixth example is the following "disable/enable ports" command:

[disable|enable] ports <portlist> where "disable ports" disables the ports identified in <portList> and "enable ports" enables these ports.

The one or more actions may also include sending one or more trap messages to a trap server accessible by a network administrator, such as a SNMP trap server. An action such as this may be specified by the following syntax:

snmptrap <id> <message> {period} which specifies periodically sending the specified message <message> to a SNMP server (along with the code <id>) at a periodicity of {period} seconds. If {period} is 0, the message is sent only once, and if {period} is not specified, a default value of 0 is assumed. For example, snmptrap 100 "TCP SYN flood attack is detected" 30 sends the specified message to the SNMP trap server every 30 seconds.

The one or more actions may also include logging one or more messages to a file or message server accessible by a network administrator. In one example, such an action is specified by the following syntax:

syslog <message> <level> {period} which specifies periodically logging the specified message <message> to the message server at a periodicity of {period} seconds (which should be an integer multiple of {integer}, the periodicity of the underlying rule). If the value {period} is not specified, a default value of 0 is assumed, indicating that the message is logged only once. The string <level> is a priority indicator that can take on any of the following values: DEBU, INFO, NOTI, WARN, ERRO, or CRIT, where DEBU indicates the message string relates to a debugging operation; INFO, that the string is informational, NOTI, that the string is an important notification to the network administrator, WARN, that the message is a warning, ERRO, that an error has been encountered, and CRIT, that the condition of the network switch is critical.

In one implementation, the message strings of the messages that are sent to the trap server or logged to the message server may include one or more variables that are replaced by underlying data values when the actions are performed. For example, the variable $port in a message string is replaced by the current ingress port when the message is logged or sent. In one example, the following variables may be used within the message string:

The one or more conditions (or any thresholds used in formulating these conditions) within the IF portion of a rule may also include any of the foregoing variables to allow rule triggering based on dynamically changing conditions within the network switch. Alternatively, the one or more conditions (or any thresholds therein) may be predetermined.

$policyName—replace with policy name
$ruleName—replace with rule name
$<counterName>—replace with contents of counter with indicated counter name <counterName>
$ruleValue—replace with result, TRUE or FALSE, of logical expression associated with current rule
$ruleThreshold—replace with the threshold associated with current rule
$ruleInterval—replace with the sampling/evaluation interval of current rule
$vlanName—replace with the VLAN name to which the policy is assigned
$port—replace with the port where the policy is applied The one or more conditions (or any thresholds used in formulating these conditions) within the IF portion of a rule may also include any of the foregoing variables to allow rule triggering based on dynamically changing conditions within the network switch. Alternatively, the one or more conditions (or any thresholds therein) may be predetermined.

The one or more actions within either the THEN or ELSE portions of the rule may also include any of the foregoing variables to allow the actions to be taken if the logical conditions are satisfied or not to be dynamically changed based on network conditions. Alternatively, the one or more actions specified in either the THEN or ELSE portions of the rule may be predetermined.

The one or more actions may also include modifying one or more existing rules that are already applicable to the switch. In one example, actions such as this is specified by the following syntax:

deny <ruleName>
permit <ruleName> where "deny" changes the indicated rule <ruleName> so that packets meeting the packet profile defined in that rule are denied network access, while "permit" changes the indicated rule <ruleName> so that packets meeting the profile defined in that rule are permitted network access.

The one or more actions may also include applying one or more additional rules to the switch (using the previously discussed "configure" command for example).

They may further include changing the assigned QoS profile assigned to a particular packet. In one example, an action such as this is performed using the following syntax:

qosprofile <ruleName> <QPx>
which specified assigning packets meeting the profile defined in <ruleName> with the QoS value <QPx>.

The rule structure may also support a nesting feature, whereby individual rules may be nested together to define more complex triggering conditions. The following example illustrates a nested rule structure, whereby, among other conditions, rule3 is only triggered when the logical expression defined by the IF portion of rule2 is satisfied:

```
entry rule1 {
    IF {
        destination-address 192.168.16.0/24;
        destination-port 2049;
    }
    THEN {count counter1}
entry rule2 {
    IF {count counter1 > 1000000 }
        THEN {deny rule1}
entry rule3 {
    IF {count counter1 < 2000000;
        rule2 = TRUE;
    }
    THEN {
        permit rule1;
        mirror rule1;
    }
```

As the rules are executed sequentially, rule3 overrides rule2 by permitting access to those packets nominally subject to rule2 when the contents of counter1 is less than 2,000,000. The net result is that packets meeting the profile specified in rule1 are denied access if the cumulative number of these packets received at the switch is greater than or equal to 2,000,000, but, if the cumulative number of such packets received at the switch is greater than 1,000,000 but less than 2,000,000, the packets are permitted access (but mirrored to a network administrator).

The rule structure may also support "match any" and "match all" formats, which are formats designed to handle compound expressions. The "match any" format triggers a rule whenever any one of many logical conditions are satisfied, while the "match all" format triggers the rule only when all the logical conditions are satisfied. In the following example of the "match any" format, the rule is triggered if either the contents of <counter1> or <content2> exceeds 10,000:

```
entry match any or_rule {
    IF {
        count counter1 > 10000;
        count counter2 > 10000;
    }
    THEN {one or more specified actions}
}
```

In the following example of the "match all" format, however, the rule is triggered if the contents of <counter1> exceed 10,000 and the contents of <counter2> exceed 10,000:

```
entry match all and_rule {
    IF {
        count counter1 > 10000;
        count counter2 > 10000;
    }
    THEN {one or more specified actions}
}
```

In one example if neither format is specified, the "match all" format is assumed.

The rule structure may also support fractional thresholds, i.e., a threshold expressed as a fraction. The following example illustrates the use of a fractional threshold:

```
entry fraction {
        IF { ratio counter1 counter2 > 1/1000;
        }
             THEN {
                 <one or more specified actions>;
                 }
     }.
```

The rule structure may also support global rules, which are rules applicable to all interfaces, i.e., ports or VLANs, within a particular grouping known as a "policy." In the following example, a global rule, global_rule, is applied to all interfaces within a particular policy. The rule is designed to detect if there is a SYN attack at any of the ports within the policy. In this example, a SYN attack is defined as the condition where, over a 2 second period, the change in the number of SYN packets exceeds the change in the number of TCP packets by over a factor of 10. If a SYN attack is detected, a second rule, syn_attack, is applied to determine the specific port that is under attack:

```
entry syn    {
      IF     {
             protocol tcp_flags SYN;
      }      THEN {
                    count tcpSynCounter;
      }
}
entry tcp    {
      IF     {
                    protocol tcp;
      }      THEN {
                    count tcpCounter;
             }
}
entry global_rule    {
      IF    { delta-ratio tcpSynCounter tcpCounter > 10 ;
             global;
             period 2;
             min-value 100;
             hysteresis 2;
             }
             THEN {
                    syslog "Syn attack is detected" WARN;
             }
}
entry syn_attack    {
      IF    { delta tcpSynCounter > 1000 ;
             global_rule = TRUE;
             #Now we can find out which port is under attack
             period 2;
             hysteresis 2;
             }
             THEN {
                    syslog "Syn attack on port $port
                    is detected" WARN
                    deny syn;
             }     ELSE {
                    syslog "Syn attack on port $port is no longer
                    detected" WARN;
                    permit syn;
             }
}
```

The rule structure may also support a "byte" option, which allows counters that normally function as packet counters to also function as byte counters. The following example demonstrates the use of the byte option in a rule designed to detect the onset of a particular network attack characterized by large average size ping packets:

```
entry icmp {
       IF     {
                     protocol icmp;
       }     THEN {
                     count PingCount;
              }
}
entry ping_of_death   {
       IF     { ratio-delta pingCount.byte pingCount > 1000 ;
              #large size ping
              }
              THEN {
                     <one or more specified actions> ;
              }
}
```

The rule structure may also support an "average" option, which allows averages to be taken over a defined sampling period. In the following example, through use of the "average" option, the rule specified one or more specified actions to be performed if the average change in the pingCount over 10 samples is greater than 2,000:

```
entry icmp {
       IF     {
                     protocol icmp;
       }     THEN {
                     count pingCount ;
              }
}
entry average {
       IF { delta pingCount > 2000;
              average 10; # average for 10 samples
       }
              THEN {
                     <one or more specified actions>;
                     }
}.
```

The rule structure may also support a "time" feature, whereby the time period during which one or more of the conditions must be satisfied may be specified. In the following example, this "time" feature is used to specify a threshold of 1,000,000 that is applicable only during business hours (9 AM-5 PM):

```
entry rule1 {
       IF {
              destination-address 192.168.16.0/24;
              destination-port 2049;
       }
              THEN {count counter1}
entry rule2 {
       IF {
              count counter1 > 1000000 ;
              time within 9AM and 5PM;
       }
              THEN {deny rule1}
```

Assuming the threshold of 1,000,000 represents quota applicable to the user, this example enforces the quota by denying access during business hours to a user exceeding the quota, but allowing the user access outside of business hours.

In the following example, this "time" feature is used to specify thresholds that vary depending on time of day, with a threshold of 1,000,000 applicable during business hours (9 AM-5 PM) and a threshold of 2,000,000 applicable outside of business hours:

```
            entry rule1 {
                IF {
                        destination-address 192.168.16.0/24;
                        destination-port 2049;
                }
                        THEN {count counter1}
            entry rule2 {
                IF { count counter1 > 1000000 ;
                        time within 9AM and 5PM;
                }
                        THEN {deny rule1}
            entry rule3 {
                IF { count counter1 > 2000000 ;
                        time outside 9AM and 5PM;
                }
                        THEN {deny rule1}
```

The rule structure allows one or more rules embodying any of the methods illustrated in FIGS. 1-3 to be formulated and then realized on a particular switch by downloading them to the switch, and then arranging to have one or more processors at the switch compile the rules into executable form (if not already in that form) and execute the rules on an ongoing basis as packets are received at the switch. In this section, examples of rules embodying the methods of FIGS. 1-3 are presented and discussed. Examples of rules embodying on-switch methods of enforcing policies relating to network switch resources are presented first, followed by examples of rules embodying on-switch methods of detecting and mitigating network anomalies, followed by examples of rules embodying on-switch methods of selectively filtering packets to an externally-accessible port.

5. Examples of Rules Embodying Methods of Enforcing Policies Relating to One or More Network Switch Resources The following rule embodies a method of enforcing a user traffic quota by monitoring the total byte count of packets received from (or transmitted by) the user, and, if the quota is exceeded, blocking the traffic and sending a notification to the network administrator to inform him of the situation:

```
entry monthly__traffic__limit__10.0.0.x {
        IF { count bytes__10.0.0.x > quota; # Limit 16MB if
        quota = 16777216
            } THEN {
            snmptrap 1 "Traffic on network 10.0.0.x has exceeded monthly
            quota";
            deny rule__10.0.0.x;
        } ELSE {
            permit rule__10.0.0.x; # Allow traffic again if quota is increased
                            # Or monthly traffic counter is reset
            }
        }
```

The ELSE clause restores access by the user once the quota is increased or the monthly traffic counter increased.

The following rule monitors a user's bandwidth consumption, and, if that consumption exceeds a threshold, a QoS profile reflective of a lower packet priority is assigned to the user's traffic:

```
            entry traffic__rate__limit__10.1.0.x {
        IF { rate bytes__10.1.0.x > rate__limit;
        # Limit 1MB per second if rate__limit = 1048576
                period 1; # Sample and evaluate once every second
                } THEN {
                qosprofile rule__10.1.0.x QP0; # Place traffic to lowest queue
            } ELSE {
```

```
                qosprofile rule__10.1.0.x QP3; # Restore traffic to normal queue
                }
            }
```

The following rule permits traffic on a guest client only during business hours:

```
    entry guest__10.2.0.x {
        IF { time Monday-Friday 7:00am-6:00pm; # During business hours
                } THEN {
                permit rule__10.2.0.x;
        } ELSE {
                deny rule__10.2.0.x;
                }
        }
```

6. Examples of Rules Embodying On-Switch Methods of Detecting and Mitigating Network Anomalies The following rule detects and mitigates a particular form of denial of service (DOS) attack known as a TCP SYN-ACK Flood, whereby the network is beset with a flood of TCP packets with the SYN-ACK flag set. The rule counts the number of SYN-ACK packets and monitors the SYN-ACK packet rate. If the rate exceeds a particular threshold, indicating that a flood condition is present, the rule responds by logging a message alerting the network administrator to the situation, and disabling the ingress port:

```
entry tcp__syn-ack__attack {
        IF { rate tcpSynAckCount > 5000; # High rate of syn-ack
        packets
            } THEN {
            syslog "SYN-ACK attack is detected on port $port" WARN;
            CLI "disable port $port"; # Disable port under attack
            }
        }
```

The following rule detects and mitigates another form of DOS attack known as a Ping of Death attack. In this particular form of attack, ping packets having large frame sizes flood the network, causing a Denial of Service condition on the input buffer of the target host:

```
entry ping__of__death {
            IF { rate-ratio pingByteCount pingCount > 1500; # Large
            ping packet size
        } THEN {
        syslog "Ping of death is detected on port $port" WARN;
        }
}
```

Some classes of viruses and worms exhibit signatures, such as attacking a specific IP port, sending packets with a specific length or specific information in the IP header, creating excessive network traffic, or any combination of the foregoing. For example, the W32.5QLExp.Worm, commonly known as the Slammer worm, sends an excessive amount of 376-byte packets to UDP port 1434. The following rule detects packets having this signature, and, in response, blocks all such traffic:

```
            entry W32.SQLExp.Worm {
        IF { rate counter__376Byte__UDP-1434 > 2000;
            } THEN {
            snmptrap 2 "Slammer worm detected on port $port";
```

```
    deny rule_376Byte_UDP-1434;
} ELSE {
    snmptrap 3 "Slammer worm no longer detected on port $port";
    permit rule_376Byte_UDP-1434;
    }
}
```

Excessive email traffic may indicate a worm that is propagating itself by sending out email, or an infected host sending out spam email. The following rule detects excessive email traffic such as that generated by a mass-email worm and, in response, alerts the network administrator and mirrors the suspicious traffic to a CPU for further analysis:

```
entry email_traffic {
    IF { rate emailCount > 5000; # Abnormally high email traffic rate
    } THEN {
    # Send a trap to alert the network administrator
    snmptrap 4 "Excessive email traffic ($currentValue) detected on
    $port";
    # Mirror traffic for further analysis
    mirror add email to-cpu;
    } ELSE {
    snmptrap 5 "Email traffic ($currentValue) on $port falls below
    threshold";
    mirror delete email;
    }
}
```

Once the condition has abated (determined when the rate of the traffic falls below the threshold), another message is sent to the network administrator indicating this, and mirroring is stopped.

The following rule monitors utilization of a particular port (ingress or egress) by a certain application, and, if this utilization exceeds a threshold, indicating the link is about to become overloaded, alerts the network administrator to address the problem before traffic is dropped due to oversubscription of the link:

```
entry port_utilization {
IF { rate portCount > 1339285; # Average utilization rate on Gig port
is greater 90%
    period 1800; # Monitor every half an hour
    } THEN {
    # Send a trap to alert the network administrator
    snmptrap 6 "Traffic on $port approaching maximum utilization";
    }
}
```

The following rule alerts the network administrator to excessive ARP traffic on the network:

```
entry arp_rate {
IF { rate arpCount > 1000; # Notify if arp rate is greater than 1000 pps
    } THEN {
    # Send a trap to alert the network administrator
    snmptrap 7 "Arp traffic rate on $port is $currentValue";
    }
}
```

The following rule alerts the network administrator if there is excessive ping traffic on the network:

```
entry icmp_rate {
IF { rate icmpCount > 5000; # Notify if ping rate is greater than
5000 pps
    } THEN {
```

```
    # Send a trap to alert the network administrator
    snmptrap 8 "Icmp rate ($currentValue) on $port exceeds
    threshold";
    } ELSE {
    # Notify again when it falls below threshold
    snmptrap 9 "Icmp rate ($currentValue) on $port falls below
    threshold";
    }
}
```

Once the ping traffic has fallen below the threshold, the rule dynamically responds by alerting the network administrator to this.

7. Examples of Rules Embodying On-Switch Methods of Selectively Filtering Packets to an Externally-Accessible Port The following rule is a rate-ratio triggered rule that mirrors ping traffic to the external port only when the rate-ratio exceeds a threshold:

```
entry ping_of_death {
IF { rate-ratio pingByteCount pingCount > 1500; # Large ping packet
size
    } THEN {
    mirror add ping to-port 8:1; # Mirror traffic to an external appliance
    on port 8:1
    } ELSE {
    mirror delete ping ; # No more attack detect, stop mirror traffic
    }
}
```

If the rate-ratio subsequently falls below the threshold, the rule dynamically responds by ceasing the mirroring of the packets.

The following rule is a rate-triggered rule that mirrors traffic to the external port only when the rate of utilization of a particular port exceeds a threshold:

```
entry port_utilization {
IF { rate portCount > 3*averagePortUtilization; # Abnormal port
utilization
    period 300; # Monitor every 5 minutes
        } THEN {
    # Encapsulate and mirror traffic to an external appliance listening on
    UDP port 5000
        mirror add port $port to-client 192.168.2.245:5000;
        }
}
```

The following rule is a rate-triggered rule that mirrors ICMP traffic to the external port only when the rate exceeds a threshold:

```
entry icmp_rate {
    IF { rate icmpCount > 5000; # Notify if ping rate is greater than
    5000 pps
        hysteresis 2000;
        period 2;
        } THEN {
        mirror add icmp to-port 8:1;
    } ELSE {
        mirror delete icmp;
    }
}
```

Again, if the ICMP traffic rate subsequently falls below the threshold, the rule dynamically responds by ceasing the mirroring of this traffic.

The following rule is a rate-triggered rule that mirrors email traffic to the external port only when the rate exceeds a threshold:

```
entry email_traffic {
    IF { rate emailCount > 5000; # Abnormally high email traffic rate
    } THEN {
        mirror add email to-port 8:1;
    } ELSE {
        mirror delete email;
    }
}
```

Once again, if the email traffic rate subsequently falls below the threshold, the rule dynamically responds by ceasing the mirroring of this traffic.

Figure 5:
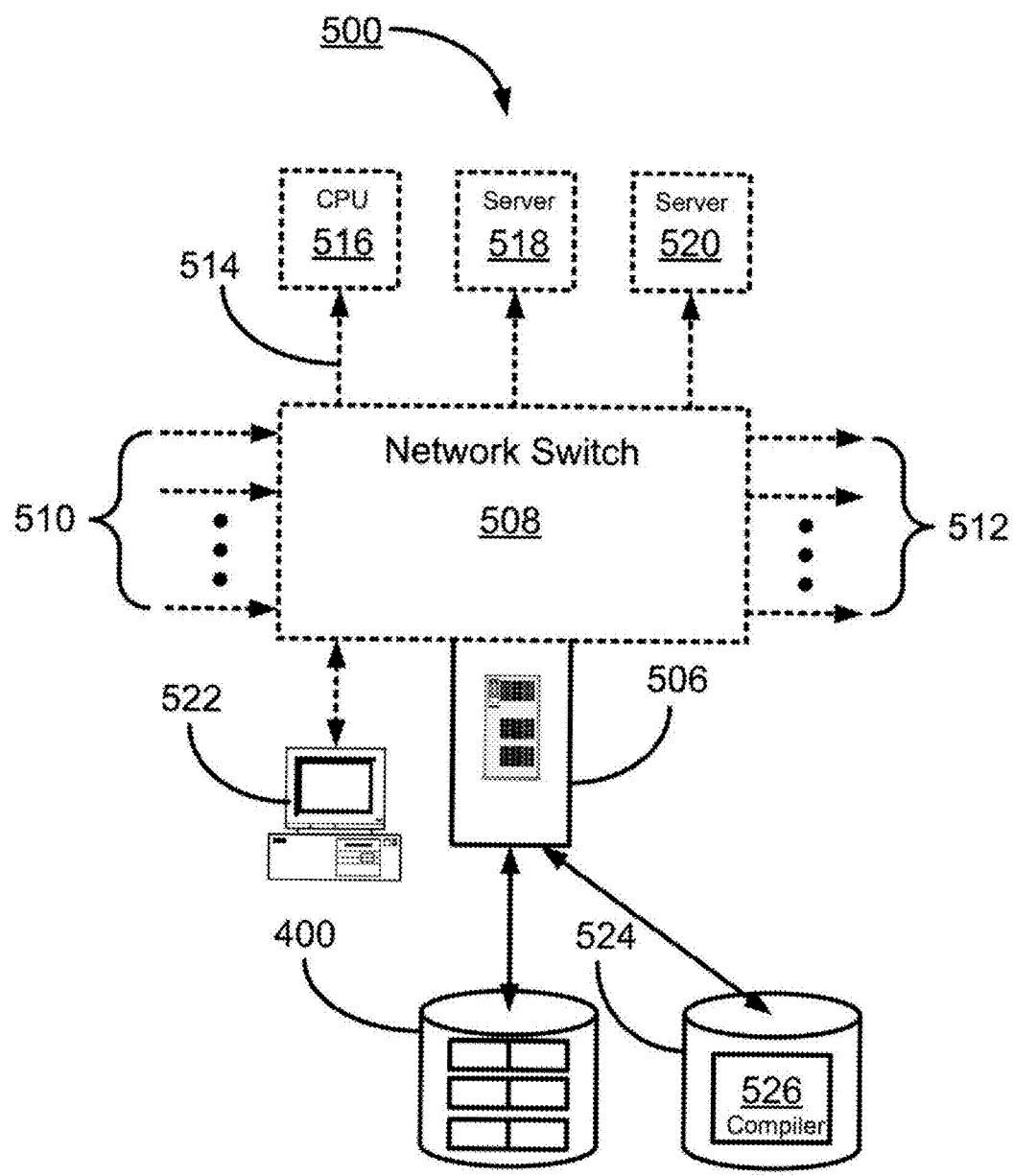
FIG. 5 is a block diagram of an embodiment of a system for performing one or more network switch functions, the system comprising the one or more processor readable media of FIG. 4 and one or more processors configured to access and execute the one or more rules held by the processor readable medium.

8. Systems for Performing One or More Network Switch Functions Responsive to One or More Rules Turning back to FIG. 4, the one or more processor readable media 400 holding the one or more rules 402a, 402b, 402c may be part of a system. FIG. 5 illustrates an embodiment 500 of such a system that is configured for performing one or more network switch functions by or for network switch 508. In this embodiment, the system comprises the one or more processor readable media 400 of FIG. 4, holding the one or more rules 402a, 402b, 402c embodying any of the previously described methods, including those illustrated in FIGS. 1-3, and one or more processors 506 for accessing the one or more rules 402a, 402b, 402c from the one or more processor readable media 400, compiling them if necessary, and executing them as packets are received so as to perform the one or more network switch functions. The network switch 508 has one or more ports of ingress 510 and one or more ports of egress 512. The network switch 508 is shown in phantom as it may or may not be part of the system.

In one implementation, the one or more processors 506 are configured to compile the one or more rules into executable form, and then execute the one or more rules to perform the one or more network switch functions. In this implementation, the network administrator also specifies one or more ports a rule is applicable to (as well as the port direction, whether ingress or egress), one or more VLANs a rule is applicable to, or whether the rule is a wildcard rule applicable to all ports. such as through the CLI "configure" command (discussed previously). To remove application of a rule from one or more ports or VLANs, the network administrator in this implementation may input the previously-discussed CLI "unconfigure" command over a user interface.

The rules may be executed once or more than once, although in practice, they will normally be executed on an ongoing basis as packets are received at or transmitted from the switch. In one implementation, the rules are executed periodically at the level of periodicity specified in the rules, which may differ amongst the rules.

A priority resolution scheme may also be employed to resolve conflicts between rules. In one approach, the priority resolution scheme gives highest priority to rules applicable to specific ports, the next highest priority to rules applicable to specific VLANs, and the lowest priority to wildcard rules applicable to all ports. For example, if a particular rule, rule1, is applied to port A that is part of VLAN B, and a second conflicting rule, rule 2, is applied to VLAN B, then rule1 will take priority over rule2 as to port A, and rule 2 will be inapplicable to port A.

In the system 500, the one or more processors 506 may form at least a portion of or be integral with the network switch 508, while, in another, they are distinct from but coupled to the network switch 508. In one example, the one or more processors 506 are implemented as one or more ASICs.

In one embodiment, the network switch 508 includes one or more externally-accessible ports 514 accessible by a network administrator to which mirrored packets may be directed. The port 514 may be coupled to a remote client or CPU 516 through which the network administrator gains access to the mirrored packets, or the port 514 may be a monitor port through which the network administrator gains access to the mirrored packets.

The network switch 508 may also be coupled to a trap server 518 accessible by the network administrator to which traps (interrupts) or trap messages may be sent responsive to execution of the rules. In one example, the server 518 is a SNMP server for the receipt of SNMP traps and trap messages.

The network switch 508 may also be coupled to a server 520 for the receipt of messages logged to the server (or a file within the server) in response to the execution of one or more rules. The server 520 may be distinct from the server 518 or the two may be implemented as the same server.

The network switch 508 may also be configured with a user interface 522 for the receipt of rules and CLI commands from a network administrator for applying the rules to specific ports or VLANs of the network switch. The user interface 522 may also be configured to display reports showing the status of the various rules, including reports illustrating which rules apply to which ports and VLANs.

The one or more processors 506 may be coupled to one or more processor readable media 524 on which is stored a compiler 526 for compiling the one or more rules 402a, 402b, 402c and putting them into executable form. The one or more processor readable media 524 storing the compiler may be distinct from the one or more media 400 storing the one or more rules 402a, 402b, 402c. or the two may be the same one or more media.

The rules may also be embodied in hardware or combinations of hardware and software. In one implementation, the system comprises logic tangibly embodying one or more rules, the one or more rules embodying any of the previously-described methods, including those illustrated in FIGS. 1-3.

9. Applications of the Rules to Edge, Non-Gateway Switches

Figure 6:
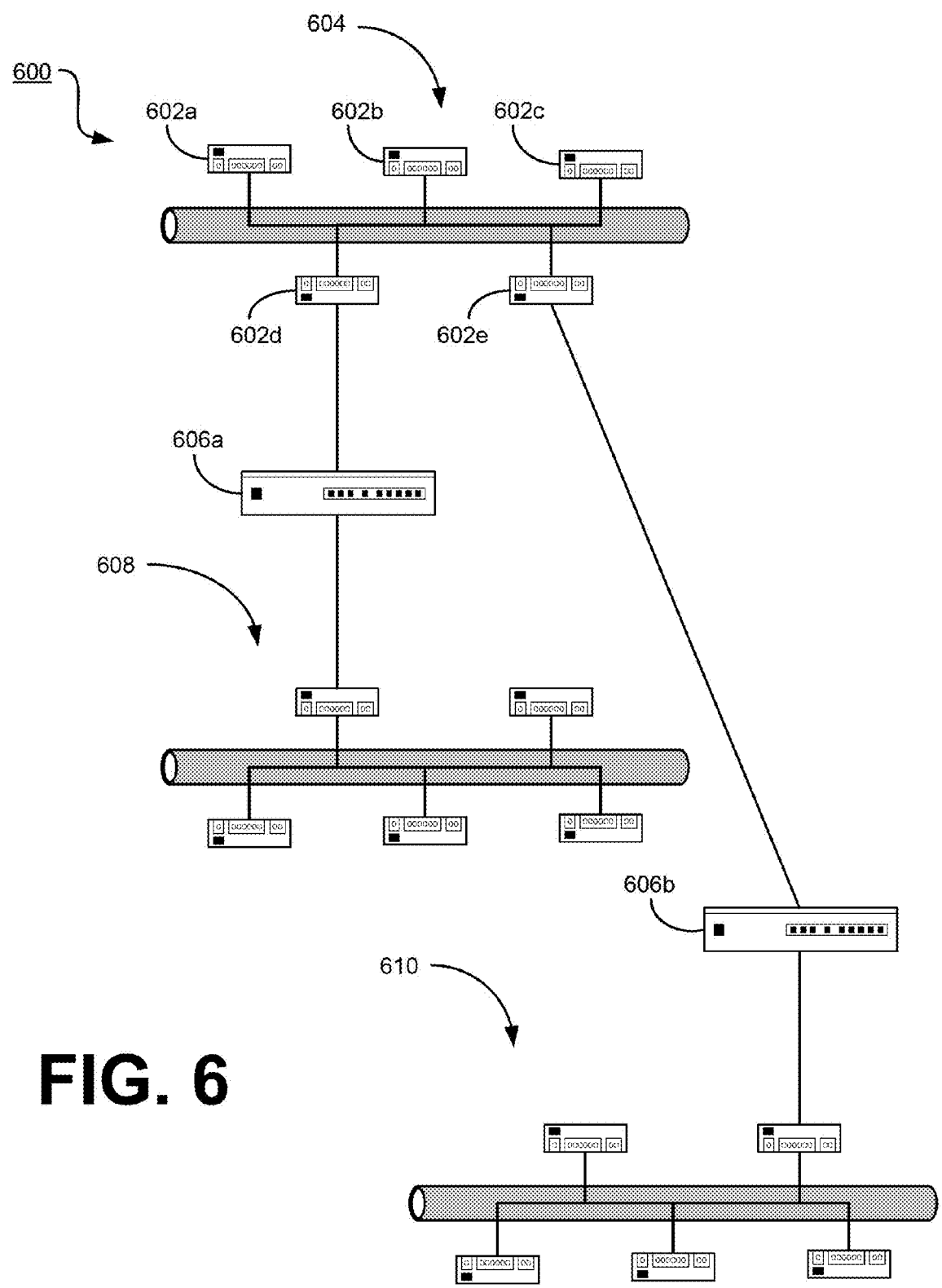
FIG. 6 is a block diagram of a system comprising one or more non-gateway network switches interconnected to form a first subnet that is coupled to one or more other subnets by one or more gateway switches or servers, one or more of the non-gateway switches including on-switch means for performing any of the methods of FIGS. 1-3.

The foregoing rules may be applied to gateway switches as well as edge, non-gateway switches within a particular subnet. While application to gateway switches protects against external threats, application to one or more (if not all) edge, non-gateway switches protects against internally-generated network threats. FIG. 6 illustrates an embodiment 600 of a system comprising one or more non-gateway switches 602a, 602b, 602c, 602d, 602e that are interconnected to form a subnet 604 that is coupled to one or more other subnets 608, 610 through one or more gateway switches or servers 606a, 606b. One or more of the internal, non-gateway switches 602a, 602b, 602c, 602d, 602e within the subnet 604 include a means (such as the one or more processor readable media 400 of FIG. 4 and one or more processors for accessing and executing the rules stored thereon, or logic embodying the rules and other logic for executing the rules) for performing any of the previously described methods, including the methods illustrated in FIGS. 1-3.

While various embodiments of the invention have been described, it will be apparent to those of ordinary skill in the art that many more embodiments and implementations are possible that are within the scope of this invention.

What is claimed is:

1. A method in a network switch having a processor and logic therein for performing network anomaly detection and mitigation, wherein the method comprises:
   processing a plurality of packets associated with a particular user connected with the network switch;
   updating one or more usage-derived packet statistics based on the plurality of packets associated with the particular user, wherein each of the one or more updated usage-derived packet statistics are specific to the particular user;
   detecting a network anomaly based on a comparison of the updated one or more usage-derived packet statistics against a quota of network switch resources for the particular user; and
   mitigating the detected network anomaly by modifying one or more existing rules applicable to the network switch for processing the plurality of packets associated with the particular user, the mitigating comprising at least de-prioritizing access of the particular user to the network switch.

2. The method of claim 1, wherein the mitigating comprises one of dewing further access to the particular user having exhausted the quota of network switch resources or lowering a priority assigned to the particular user's packets from an original priority and permitting access to the particular user at a lower priority.

3. The method of claim 1, wherein each of the one or more usage-derived packet statistics are associated with the particular user based on the packets received from, or the packets transmitted by the network switch on behalf of the particular user;
   wherein the usage-derived packet statistics specifies a cumulative count of packets received from or transmitted by the particular user, a cumulative count of packet bytes received from or transmitted by the particular user, or a rate at which the cumulative count of packets or the cumulative count of packet bytes are received at or transmitted from the network switch on behalf of the particular user; and
   wherein the comparison against a quota of network switch resources for the particular user comprises comparing the cumulative count of packets, the cumulative count of packet bytes, or the rate at which the cumulative count of packets or the cumulative count of packet bytes are received at or transmitted against the quota of network switch resources for the particular user.

4. The method of claim 1, wherein the one or more existing rules applicable to the network switch for processing the plurality of packets associated with the particular user comprise one of:
   a deny packet rule to deny the plurality of packets meeting a packet profile defined by the dew packet rule;
   a permit packet rule to permit the plurality of packets meeting a packet profile defined by the permit packet rule or
   enforcing the quota of the particular user only during specified business hours and allowing access exceeding the quota of the particular user outside of the specified business hours.

5. The method of claim 1, wherein mitigating the detected network anomaly by modifying the one or more existing rules applicable to the network switch for processing the plurality of packets associated with the particular user comprises:
   applying one or more additional rules to the network switch for processing the plurality of packets associated with the particular user.

6. The method of claim 5, wherein applying the one or more additional rules comprises: applying a Quality of Service (QoS) profile to the network switch for processing the plurality of packets associated with the particular user.

7. The method of claim 6, wherein applying the QoS profile to the network switch for processing the plurality of packets associated with the particular user comprises:
   permitting access to the network switch for processing the plurality of packets associated with the particular user;
   lowering a priority assigned to the packets processed on behalf of the particular user until the particular user pays or agrees to pay a higher price for additional access to the network switch or for restoring the priority from a lowered state of the priority to an original state of the priority.

8. The method of claim 6, wherein applying the QoS profile to the network switch for processing the plurality of packets associated with the particular user comprises:
   blocking traffic associated with the particular user; and
   sending a notification to a network administrator for the network switch describing blocking of the traffic associated with the particular user.

9. The method of claim 1, wherein mitigating the detected network anomaly by modifying the one or more existing rules applicable to the network switch for processing the plurality of packets associated with the particular user comprises:
   mirroring the plurality of packets associated with the particular user to a port of the network switch which is accessible to a network administrator; and
   sending a trap to a server accessible by a network administrator alerting the network administrator to examine the mirrored plurality of packets associated with the particular user and to take appropriate action.

10. The method of claim 1, wherein mitigating the detected network anomaly by modifying the one or more existing rules applicable to the network switch for processing the plurality of packets associated with the particular user comprises:
    disabling a port of the network switch at which the plurality of packets associated with the particular user are being received at, or transmitted from, on behalf of the particular user.

11. The method of claim 1, wherein detecting the network anomaly comprises at least one of:
    detecting utilization over a threshold of a particular switch port on the network switch;
    detecting excessive email traffic over a threshold associated with the particular user;
    determining a rate at which the plurality of packets associated with the particular user are received at or transmitted from the particular switch port of the network switch;
    determining a user traffic quota exceeds the threshold associated with the particular user based on a total byte count of packets received from or transmitted on behalf of the particular user; and
    determining that an average size of type-specific packets exceed the threshold associated with the particular user.

12. The method of claim 1, wherein mitigating the detected network anomaly by modifying the one or more existing rules applicable to the network switch for processing the plurality of packets associated with the particular user comprises:
    specifying one or more match conditions based on a header of the plurality of packets associated with the particular user, wherein the one or more match conditions are selected from the group comprising: IP (Internet Protocol) source address; IP destination address; IP protocol; IP TOS (Terms Of Service) bits; a flag indicating whether a respective one of the packets is fragmented; TCP (Transmission Control Protocol) source port; UDP (User Datagram Protocol) source port; TCP destination port; UDP destination port; TCP flags; IGMP (Internet Group Management Protocol) message type; IGMP type; IGMP code; Ethernet packet type; Ethernet source MAC (Media Access Control) address; and Ethernet destination MAC address.

13. A network switch having non-transitory processor readable media with instructions thereon that, when executed by a processor of the network switch, the instructions cause the network switch to perform network anomaly detection and mitigation operations comprising:

processing a plurality of packets associated with a particular user connected with the network switch;

updating one or more usage-derived packet statistics based on the plurality of packets associated with the particular user, wherein each of the one or more updated usage-derived packet statistics are specific to the particular user;

detecting a network anomaly based on a comparison of the updated one or more usage-derived packet statistics against a quota of network switch resources for the particular user; and mitigating the detected network anomaly by modifying one or more existing rules applicable to the network switch for processing the plurality of packets associated with the particular user, the mitigating comprising at least de-prioritizing access of the particular user to the network switch.

14. The network switch of claim 13:

wherein the mitigating comprises one of denying further access to the particular user having exhausted the quota of network switch resources or lowering a priority assigned to the plurality of packets associated with the particular user from an original priority and permitting access to the particular user at a lower priority.

15. The network switch of claim 13, wherein detecting the network anomaly comprises at least one of:

detecting utilization over a threshold of a particular switch port on the network switch;

detecting excessive email traffic over a threshold associated with the particular user;

determining a rate at which the plurality of packets associated with the particular user are received at or transmitted from a particular switch port of the network switch;

determining a user traffic quota exceeds a threshold associated with the particular user based on a total byte count of packets received from or transmitted on behalf of the particular user; and determining that an average size of type-specific packets associated with the particular user exceed the threshold associated with the particular user.

16. The network switch of claim 13, wherein mitigating the detected network anomaly by modifying the one or more existing rules applicable to the network switch for processing the plurality of packets associated with the particular user comprises:

applying a Quality of Service (QoS) profile to the network switch for processing the plurality of packets associated with the particular user.

17. The network switch of claim 16, wherein applying the QoS profile to the network switch for processing the plurality of packets associated with the particular user comprises:

permitting access to the network switch for processing the plurality of packets associated with the particular user;

lowering a priority assigned to the packets processed on behalf of the particular user until the particular user pays or agrees to pay a higher price for additional access to the network switch or for restoring the priority from a lowered state of the priority to an original state of the priority.

18. A network switch comprising:

a processor for executing logic;

an ingress port to receive a plurality of packets associated with a particular user connected with the network switch;

an egress port for transmitting processed packets on behalf of the particular user;

processor readable media for storing one or more usage-derived packet statistics; wherein the processor and the logic are to:

update the one or more usage-derived packet statistics based on the plurality of packets to be received from, or to be transmitted on behalf of, the particular user by the network switch, wherein each of the one or more updated usage-derived packet statistics are specific to the particular user;

detect a network anomaly based on a comparison of the updated one or more usage-derived packet statistics against a quota of network switch resources for the particular user; and mitigate the detected network anomaly by modifying one or more existing rules applicable to the network switch for processing the plurality of packets to be received from, or to be transmitted on behalf of, the particular user via the processor and the logic of the network switch, the mitigating comprising at least de-prioritizing access of the particular user to the network switch.

19. The network switch of claim 18, wherein the processor and the logic to detect the network anomaly comprises the processor and the logic to determine at least one of:

utilization of the ingress port over a threshold by the particular user;

utilization of the egress port over the threshold by the particular user;

email traffic associated with a particular user over the threshold;

a rate at which the plurality of packets associated with the particular user are received at the ingress port or transmitted via the egress port, on behalf of the particular user exceeds the threshold by the particular user;

a user traffic quota exceeds the threshold for the particular user based on a total byte count of packets received at the ingress port or transmitted via the egress port, on behalf of the particular user; and an average size of type-specific packets associated with the particular user exceed the threshold by the particular user.

20. The network switch of claim 18, wherein the processor and the logic to mitigate the detected network anomaly comprises the processor and the logic of the network switch to perform at least one of:

block the ingress port;

block the egress port;

lower a priority assigned to the packets to be processed by the network switch on behalf of the particular user;

send a notification to a network administrator for the network switch describing the egress port or ingress port of the network switch is blocked due to the traffic associated with the particular user; and mirror traffic associated with the particular user to an externally accessible port accessible to a network administrator for the network switch.

* * * * *